US012291217B2

United States Patent
Wu et al.

(10) Patent No.: US 12,291,217 B2
(45) Date of Patent: May 6, 2025

(54) PEDAL FAULT DIAGNOSIS METHOD AND APPARATUS

(71) Applicant: Shenzhen Yinwang Intelligent Technologies Co., Ltd., Shenzhen (CN)

(72) Inventors: Zixian Wu, Shanghai (CN); Yongsheng Zhang, Shanghai (CN); Wei Zhang, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 376 days.

(21) Appl. No.: 17/583,588

(22) Filed: Jan. 25, 2022

(65) Prior Publication Data
US 2022/0144293 A1   May 12, 2022

Related U.S. Application Data

(63) Continuation of application No. PCT/CN2020/104654, filed on Jul. 24, 2020.

(30) Foreign Application Priority Data

Jul. 26, 2019  (CN) ......................... 201910680263.4

(51) Int. Cl.
*B60W 40/08*  (2012.01)
*B60W 50/02*  (2012.01)
(Continued)

(52) U.S. Cl.
CPC ........ *B60W 50/0205* (2013.01); *B60W 40/08* (2013.01); *B60W 50/038* (2013.01); *B60W 50/14* (2013.01); *B60W 2040/0881* (2013.01)

(58) Field of Classification Search
CPC .. B60W 50/0205; B60W 40/08; B60W 50/14; B60W 50/038; B60W 50/02;
(Continued)

(56) References Cited

U.S. PATENT DOCUMENTS

2003/0084705 A1    5/2003  Cui et al.
2006/0219048 A1*  10/2006  Ueno ...................... B60T 7/042
                                                                    74/560
(Continued)

FOREIGN PATENT DOCUMENTS

CN       104276106 A      1/2015
CN       104632444 A      5/2015
(Continued)

OTHER PUBLICATIONS

Machine Translation of the Description of CN-105691404-A, 2016, pp. 1-8 (Year: 2016).*

*Primary Examiner* — Anne Marie Antonucci
*Assistant Examiner* — Jared C Bean
(74) *Attorney, Agent, or Firm* — Leydig, Voit & Mayer, Ltd.

(57) ABSTRACT

A pedal fault diagnosis method and apparatus for a vehicle are provided, including: detecting whether a driver seat is in an unmanned state; collecting an actual zero position voltage of a pedal when the driver seat is in the unmanned state; and then determining, based on the actual zero position voltage, whether a zero position fault exists on the pedal. The apparatus may update a set value of a zero position voltage in a vehicle controller based on the actual zero position voltage that is collected when the driver seat is in the unmanned state, and may be applied to the fields of assisted driving and automatic driving. Vehicle control safety can be improved by using the actual zero position voltage that is collected when the driver seat is in the unmanned state.

18 Claims, 3 Drawing Sheets

(51) Int. Cl.
*B60W 50/038* (2012.01)
*B60W 50/14* (2020.01)

(58) Field of Classification Search
CPC ..... B60W 50/0225; B60W 2040/0881; B60W 2540/223; B60W 2050/0215; B60W 2050/0075; B60T 17/22; B60T 7/042; B60T 2270/403; B60K 26/02; G05G 1/38
See application file for complete search history.

(56) References Cited

U.S. PATENT DOCUMENTS

| | | |
|---|---|---|
| 2011/0040457 A1 | 2/2011 | Bernhardt et al. |
| 2013/0144481 A1 | 6/2013 | Syed et al. |
| 2016/0275795 A1* | 9/2016 | Lippman .................. B60T 7/12 |
| 2017/0008499 A1 | 1/2017 | Tsuchiya |
| 2018/0091550 A1 | 3/2018 | Cho et al. |

FOREIGN PATENT DOCUMENTS

| | | | |
|---|---|---|---|
| CN | 105691404 A | * | 6/2016 |
| CN | 107462423 A | | 12/2017 |
| CN | 107487280 A | | 12/2017 |
| CN | 107773247 A | | 3/2018 |
| CN | 108819713 A | | 11/2018 |
| CN | 108839559 A | | 11/2018 |
| CN | 106337751 B | | 6/2019 |
| DE | 102015214351 A1 | | 2/2017 |
| EP | 1707425 A2 | | 10/2006 |
| WO | 2016202335 A1 | | 12/2016 |

\* cited by examiner

PEDAL FAULT DIAGNOSIS METHOD AND APPARATUS

CROSS-REFERENCE TO RELATED APPLICATION

This application is a continuation of International Patent Application No. PCT/CN2020/104654, filed on Jul. 24, 2020, which claims priority to Chinese Patent Application No. 201910680263.4, filed on Jul. 26, 2019. The disclosures of the aforementioned applications are hereby incorporated by reference in their entireties.

TECHNICAL FIELD

Embodiments of this application relate to the field of vehicle-mounted electronics, and furthermore, to a pedal fault diagnosis method and apparatus.

BACKGROUND

Intelligent driving technology requires real-time monitoring of vehicle working conditions, such as speed monitoring and zero position fault detection of a pedal. A pedal zero position fault includes a zero position offset fault. The zero position offset fault means that there is a deviation between an initial zero position and an actual zero position of a vehicle pedal (such as an accelerator pedal, a brake pedal, etc.) due to reasons such as long-term aging and wear. A vehicle control program or vehicle control software usually controls a vehicle with the initial zero position of the vehicle pedal as a reference. When the reference position is inconsistent with the actual zero position, a safety risk in vehicle control may exist.

Existing zero position fault detection usually includes the following steps: collecting a voltage when a pedal is at a zero position, namely, an actual zero position voltage: comparing the actual zero position voltage with a voltage corresponding to the initial zero position, namely, an initial zero position voltage; and when a deviation between the two zero position voltages is relatively large, updating a zero position voltage in a controller of the vehicle control program or software to the actual zero position voltage. The difficulty lies in how to accurately determine whether the pedal is at the zero position, that is, how to determine whether the pedal is pressed by a driver. Currently, an implementation is to infer, based on a driving operation or statistical data, whether the pedal is in the zero position. However, the method cannot ensure that the driver does not press the pedal when a zero position voltage is collected. As a result, the collected pedal voltage may not be the actual zero position voltage. This further causes a set value of the zero position voltage in the controller to be inconsistent with the actual zero position voltage, and finally leads to poor vehicle control safety:

SUMMARY

Embodiments of this application provide a pedal fault diagnosis method and apparatus, to resolve problems such as false and missing alarm reporting of a fault that may occur in a process of inferring, based on a driving operation or statistical data, whether a pedal is in a zero position, improve vehicle control safety, and reduce driving risk.

To achieve the foregoing objective, the following technical solutions are used in this application.

According to a first aspect, a pedal fault diagnosis method is provided. The method includes: detecting whether a driver seat is in an unmanned state: collecting an actual zero position voltage of a pedal when the driver seat is in the unmanned state; and then, determining, based on the actual zero position voltage, whether a zero position fault exists on the pedal.

According to the pedal fault diagnosis method provided in the embodiments of this application, it can be detected whether there is a person in the driver seat: the actual zero position voltage of the pedal when the driver seat is in the unmanned state is collected, in other words, the actual zero position voltage that is present when the pedal is not pressed is collected: it is determined, based on the actual zero position voltage, whether a zero position fault, such as a zero position offset fault or a jamming fault, exists on the pedal; and then, a vehicle can be controlled based on the actual zero position voltage, for example, a set value of a zero position voltage in a vehicle-mounted controller is updated to the collected actual zero position voltage. The method can resolve a problem that in a process of indirectly inferring, based on a driving operation or statistical data, whether the zero position fault exists on the pedal, due to inability to accurately infer whether the pedal is pressed, the actual zero position voltage that is collected when the pedal is pressed is updated to the set value of the zero position voltage in the vehicle-mounted controller, and a control instruction such as a torque instruction issued by the vehicle-mounted controller cannot reflect an actual operation condition of the vehicle, and vehicle control safety is poor. This can improve vehicle control safety, and reduce driving risk.

For example, the detecting whether a driver seat is in an unmanned state may include one or more of the following: detecting that there is no face information in a position corresponding to the driver seat; and detecting that a pressure sustained by the driver seat is less than a pressure threshold.

In some embodiments, the determining, based on the actual zero position voltage, whether a zero position fault exists on the pedal may include the following steps: calculating an absolute value of a difference between the actual zero position voltage and an initial zero position voltage; and determining, based on a comparison result between the absolute value and a voltage threshold, whether the zero position fault exists on the pedal.

In a possible design method, the voltage threshold may include a first voltage threshold, and the zero position fault may include a jamming fault of the pedal. Correspondingly, the determining, based on a comparison result between the absolute value and a voltage threshold, whether the zero position fault exists on the pedal may include the following step: if the absolute value is greater than or equal to the first voltage threshold, determining that the jamming fault exists on the pedal.

In some embodiments, the pedal fault diagnosis method according to the first aspect may further include the following step: outputting prompt information. The prompt information may include sound, a text, an image, and the like, and is used to prompt to check whether there is a foreign object in the space in which the pedal is located. A driver may check and remove, based on the prompt information, the foreign object in the space in which the pedal is located, to improve driving safety.

Alternatively, in some embodiments, the pedal fault diagnosis method according to the first aspect may further include the following step: processing the pedal as having a pedal displacement of 0. The processing as a pedal displacement of 0 is: when it is detected that a voltage that is collected when the pedal is pressed is less than or equal to an actual zero position voltage corresponding to the jamming fault, processing the pedal as having the pedal displacement of 0, to ensure driving safety.

Alternatively, in some embodiments, the pedal fault diagnosis method may further include the following step: controlling a vehicle to enter a speed limit mode. The speed limit mode is controlling a speed of the vehicle to be less than or equal to a first safe speed threshold, to ensure driving safety.

In another possible design method, the voltage threshold includes a first voltage threshold and a second voltage threshold, the first voltage threshold is greater than the second voltage threshold, and the zero position fault includes a zero position offset fault of the pedal. Correspondingly, the determining, based on a comparison result between the absolute value and a voltage threshold, whether the zero position fault exists on the pedal may include the following step: if the absolute value is less than the first voltage threshold and is greater than or equal to the second voltage threshold, determining that the zero position offset fault exists on the pedal.

Alternatively, in some embodiments, the pedal fault diagnosis method may further include the following step: determining the actual zero position voltage as a set value of a zero position voltage in a controller. The set value of the zero position voltage in the controller is used to calculate a displacement of the pedal, to improve vehicle control safety.

Further, there may be a plurality of actual zero position voltages. Correspondingly, the determining the actual zero position voltage as a set value of a zero position voltage in a controller may include the following step: determining a maximum value in the plurality of actual zero position voltages as the set value of the zero position voltage of the controller, to further improve vehicle control safety.

According to a second aspect, a pedal fault diagnosis apparatus is provided. The apparatus comprises a detection module, a collection module, and a processing module. The detection module is configured to detect whether a driver seat is in an unmanned state. The collection module is configured to collect an actual zero position voltage of a pedal when the driver seat is in the unmanned state. The processing module is configured to determine, based on the actual zero position voltage, whether a zero position fault exists on the pedal.

In some embodiments, the detection module is further configured to detect whether there is face information in a position corresponding to the driver seat, and/or detect whether a pressure sustained by the driver seat is less than a pressure threshold.

In some embodiments, the processing module is further configured to calculate an absolute value of a difference between the actual zero position voltage and an initial zero position voltage, and determine, based on a comparison result between the absolute value and a voltage threshold, whether the zero position fault exists on the pedal.

In a possible design, the voltage threshold may include a first voltage threshold, and the zero position fault may include a jamming fault of the pedal. Correspondingly, the processing module is further configured to: if the absolute value is greater than or equal to the first voltage threshold, determine that the jamming fault exists on the pedal.

In some embodiments, the pedal fault diagnosis apparatus according to the second aspect may further include: an output module. The output module is configured to output prompt information. The prompt information may include sound, a text, an image, and the like, and is used to prompt to check whether there is a foreign object in the space in which the pedal is located.

Alternatively, in some embodiments, the processing module is further configured to process the pedal as having a pedal displacement of 0. The processing as having the pedal displacement of 0) is: when it is detected that a voltage that is collected when the pedal is pressed is less than or equal to the actual zero position voltage corresponding to the jamming fault, processing the pedal as having the pedal displacement of 0).

Alternatively, in some embodiments, the processing module is further configured to control a vehicle to enter a speed limit mode. The speed limit mode is controlling a speed of the vehicle to be less than or equal to a first safe speed threshold.

In another possible design, the voltage threshold may include a first voltage threshold and a second voltage threshold, the first voltage threshold is greater than the second voltage threshold, and the zero position fault may include a zero position offset fault of the pedal. Correspondingly, the processing module is further configured to: if the absolute value is less than the first voltage threshold and is greater than or equal to the second voltage threshold, determine that the zero position offset fault exists on the pedal.

Alternatively, in some embodiments, the processing module is further configured to determine the actual zero position voltage as a set value of a zero position voltage in a controller. The set value of the zero position voltage in the controller is used to calculate a displacement of the pedal.

Further, there may be a plurality of actual zero position voltages. Alternatively, in some embodiments, the processing module is further configured to determine a maximum value in the plurality of actual zero position voltages as a set value of the zero position voltage in the controller.

In some embodiments, the pedal fault diagnosis apparatus according to the second aspect may further include a storage module that stores a program or instructions. When the processing module executes the program or the instructions, the pedal fault diagnosis apparatus according to the second aspect may perform the pedal fault diagnosis method according to the first aspect.

It should be noted that the pedal fault diagnosis apparatus according to the second aspect may be a vehicle-mounted controller, or may be a vehicle-mounted control system in which the vehicle-mounted controller is disposed, or may be a vehicle in which the vehicle-mounted control system is disposed. This is not limited in this application.

For technical effects of the pedal fault diagnosis apparatus according to the second aspect, refer to the technical effects of the pedal fault diagnosis method according to the first aspect. Details are not described herein again.

According to a third aspect, another pedal fault diagnosis apparatus is provided. The apparatus includes a processor, where the processor is coupled to a memory. The memory is configured to store a computer program. The processor is configured to execute the computer program stored in the memory, so that the pedal fault diagnosis apparatus according to the third aspect performs the pedal fault diagnosis method according to any one of the first aspect and the implementations of the first aspect.

It should be noted that the pedal fault diagnosis apparatus according to the third aspect may be a vehicle-mounted controller, or may be a vehicle-mounted control system in which the vehicle-mounted controller is disposed, or may be a vehicle in which the vehicle-mounted control system is disposed. This is not limited in this application.

For technical effects of the pedal fault diagnosis apparatus according to the third aspect, refer to the technical effects of the pedal fault diagnosis method according to the first aspect. Details are not described herein again.

According to a fourth aspect, a chip system is provided. The chip system includes a processor and an input/output port. The processor is configured to implement a processing function described in the pedal fault diagnosis method according to any one of the first aspect and the implementations of the first aspect. The input/output port is configured to implement a sending and receiving function described in the pedal fault diagnosis method according to any one of the first aspect and the implementations of the first aspect.

For technical effects of the chip system according to the fourth aspect, refer to the technical effects of the pedal fault diagnosis method according to the first aspect. Details are not described herein again.

According to a fifth aspect, a vehicle-mounted controller is provided. The vehicle-mounted controller may include the pedal fault diagnosis apparatus according to the second aspect or the third aspect, or the chip system according to the fourth aspect.

According to a sixth aspect, a vehicle-mounted control system is provided. The vehicle-mounted control system includes the vehicle-mounted controller according to the fifth aspect.

According to a seventh aspect, a vehicle is provided. The vehicle includes the vehicle-mounted control system according to the sixth aspect.

According to an eighth aspect, a computer-readable storage medium is provided. The computer-readable storage medium includes a program or instructions, and when the program or the instructions are run on a computer, the computer is enabled to perform the pedal fault diagnosis method according to any one of the first aspect and the implementations of the first aspect.

According to a ninth aspect, a computer program product is provided. The computer program product includes a computer program code, and when the computer program code is run on a computer, the computer is enabled to perform the pedal fault diagnosis method according to any one of the first aspect and the implementations of the first aspect.

DESCRIPTION OF EMBODIMENTS

The following describes technical solutions in this application with reference to the accompanying drawings.

The technical solutions in the embodiments of this application may be applied to various vehicle-mounted control systems, for example, a vehicle control system, an automatic driving system, or an intelligent driving system.

This application presents all aspects, embodiments, or features by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in some embodiments of this application, the terms such as "for example" and "such as" are used to represent an example, an illustration, or a description. Any embodiment or design described as an "example" in this application should not be construed as being more preferred or having more advantages than another embodiment or design. As such, the term "example" is used to present a concept in a specific manner.

In some embodiments of this application, the terms "information", "signal", "message", "channel", and "signaling" may sometimes be interchangeably used. It should be noted that meanings expressed by the terms are consistent when differences between the terms are not emphasized. "Of", "corresponding and relevant", and "corresponding" may sometimes be used interchangeably. It should be noted that meanings expressed by the terms are consistent when differences between the terms are not emphasized.

In some embodiments of this application, sometimes a subscript such as $W_1$ may be written in an incorrect form such as W1. Expressed meanings are consistent when differences between them are not emphasized.

An architecture of a vehicle-mounted control system described in some embodiments of this application is intended to describe the technical solutions in the embodiments of this application more clearly, and does not constitute a limitation on the technical solutions provided in the embodiments of this application.

Figure 1:
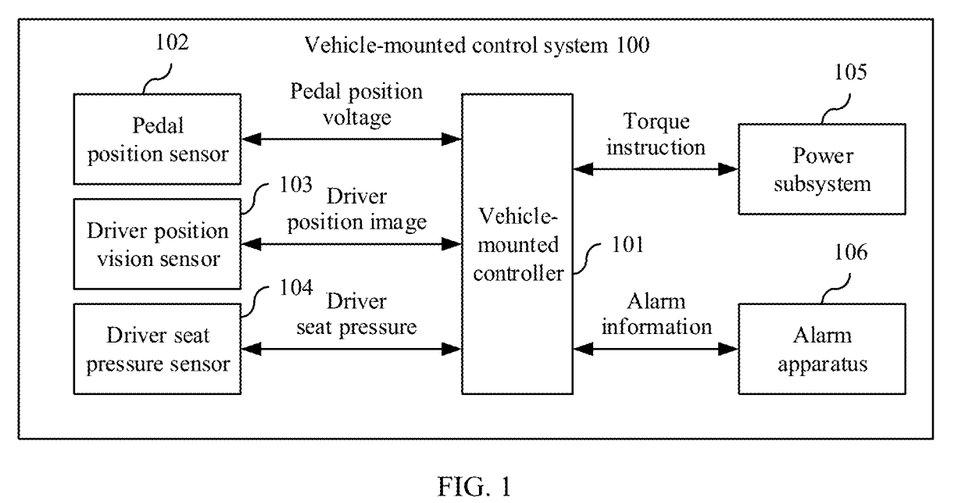
FIG. 1 is a schematic architectural diagram of a vehicle-mounted control system according to some embodiments of this application.

FIG. 1 is a schematic architectural diagram of a vehicle-mounted control system to which a pedal fault diagnosis method is applicable according to an embodiment of this application. Some scenarios in the embodiments of this application are described by using the vehicle-mounted control system shown in FIG. 1 as an example. It should be noted that solutions in some embodiments of this application may be further applied to another vehicle-mounted control systems. This is not limited in the embodiments of this application.

For ease of understanding of the embodiments of this application, first, the vehicle-mounted control system shown in FIG. 1 is used as an example to describe in detail the vehicle-mounted control system applicable to some embodiments of this application. As shown in FIG. 1, the vehicle-mounted control system includes a vehicle-mounted controller 101 and various vehicle-mounted sensors, such as a pedal position sensor 102, a driver position vision sensor 103, a driver seat pressure sensor 104, a power subsystem 105, and an alarm apparatus 106.

The vehicle-mounted controller 101 is a vehicle control center, is configured to monitor and control a vehicle, such as acceleration, deceleration, and steering, and is configured to implement a processing function in a pedal fault diagnosis method provided in this application. For example, the vehicle-mounted controller 101 detects, based on sensor information, whether there is a person sitting in the driver seat, detects a zero position voltage of a pedal, and performs zero position fault diagnosis and processing. It should be noted that FIG. 1 shows only one vehicle-mounted controller. However, in an actual vehicle, a plurality of vehicle-mounted controllers may be disposed in it, and may exchange information with each other.

The pedal position sensor 102 is configured to provide a voltage signal of an actual position of a pedal for the vehicle-mounted controller, which reflects an actual operation intention of a driver. The actual position of the pedal includes a position at which the pedal is located when the pedal is pressed and a position at which the pedal is located when the pedal is not pressed. A corresponding voltage that is collected when the pedal is not pressed is an actual zero position voltage.

The driver position vision sensor 103 is usually located in front of a driver position. It may be a camera, and is configured to detect an actual image of a driver position, for example, detect whether there is a person sitting in the driver seat.

The driver seat pressure sensor 104 is configured to detect an actual pressure sustained by the driver seat.

It should be noted that when there are a plurality of vehicle-mounted controllers 101, detection results of the various sensors may also be separately input to different vehicle-mounted controllers, to implement different control functions.

The power subsystem 105 may include an engine, a transmission, and the like, and provides power to a vehicle based on a torque instruction output by the vehicle-mounted controller 101, to implement operations such as acceleration, deceleration, and steering. The power subsystem 105 is one of the execution apparatuses to execute a fault processing measure.

The alarm apparatus 106 is configured to output a fault diagnosis result obtained by the controller, and prompt a driver that a fault exists in the vehicle. The alarm apparatus 106 is another execution apparatus for the fault processing measure, and may include one or more of the following: a speaker, an alarm indicator, and a display. For example, a fault alarm voice can be played by using the speaker. For another example, fault alarm information may be displayed on the display to the driver.

The pedal fault may include the following two types of faults: a zero position offset fault of a pedal and a jamming fault of a pedal. The former applies to a pedal aging and offset scenario, and the latter applies to a pedal jamming scenario. The pedal aging and offset scenario means that after numerous pressing and releasing operations are performed on a pedal in its lifecycle, its components become worn and aged so that the pedal cannot return to the initial zero position when the pedal is in an unstressed status. The pedal jamming scenario is a scenario in which the pedal is jammed by a foreign object such as a floor mat in a footwell, and thus cannot return back to the zero position.

Figure 2:
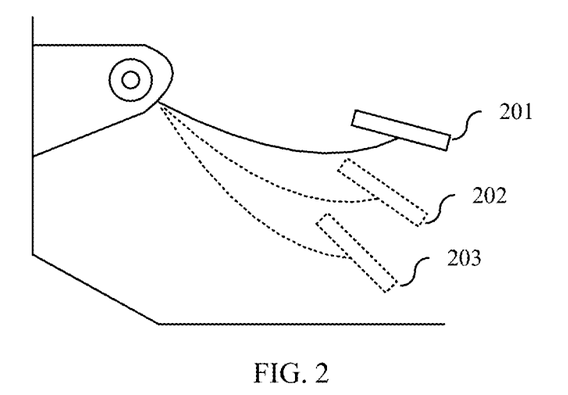
FIG. 2 is a schematic diagram of a zero position fault of a pedal according to some embodiments of this application.

For example, FIG. 2 is a schematic diagram of a scenario of a zero position fault of a pedal according to some embodiments of this application. As shown in FIG. 2, a position 201 represents an initial position of a pedal, that is, an initial zero position, when a vehicle is off an assembly line from a factory. A position 202 represents a position at which the pedal is located when the pedal is aged and is not stressed. A position 203 represents a position at which the pedal is located when the pedal is jammed and not pressed by a driver.

Currently, the vehicle-mounted controller usually generates the torque instruction based on an absolute value of a difference between a voltage collected when the pedal is pressed and an initial zero position voltage of the pedal. The power subsystem controls a vehicle action based on the torque instruction. However, in the foregoing two fault scenarios, the following problem exists: a deviation between an actual zero position voltage and the initial zero position voltage of the pedal is relatively large, and consequently, the torque instruction used to control the vehicle action, which is generated based on the absolute value of the difference between the voltage when the pedal is pressed and the initial zero position voltage of the pedal, cannot accurately reflect an actual operation intention of a driver, and causes a driving risk.

It should be understood that FIG. 1 is merely a simplified schematic diagram according to some examples for ease of understanding. The vehicle-mounted control system 100 may further include other apparatuses, components, or subsystems, for example, a communications module that is configured to communicate with other vehicles or a mobile network or a positioning and navigation module, which is not shown in FIG. 1.

Figure 3:
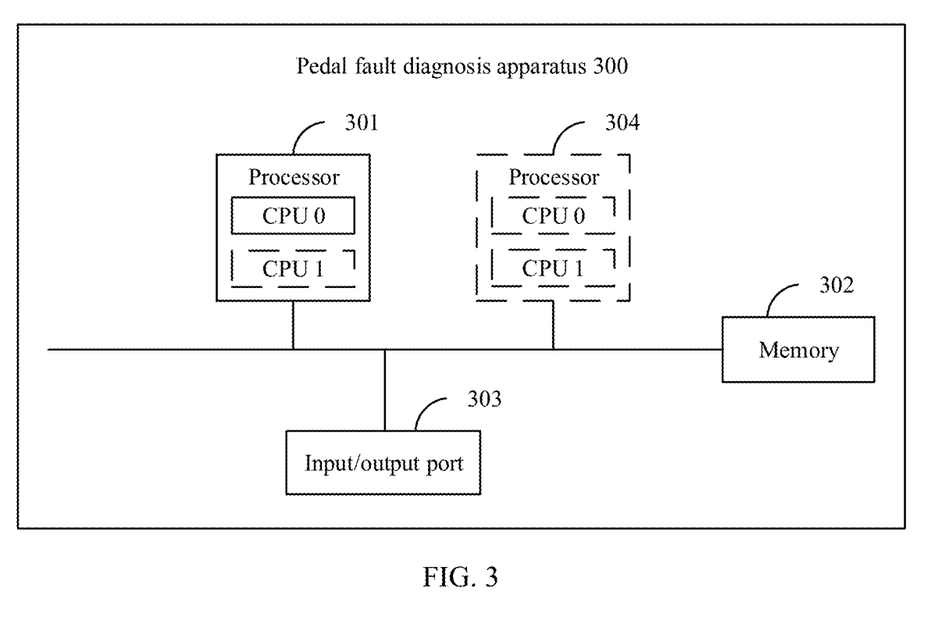
FIG. 3 is a schematic structural diagram 1 of a pedal fault diagnosis apparatus according to some embodiments of this application.

FIG. 3 is a schematic structural diagram of a pedal fault diagnosis apparatus according to some embodiments of this application. The pedal fault diagnosis apparatus may be a vehicle-mounted control device, or may be a chip applied to the vehicle-mounted control device or another component with a vehicle control function. As shown in FIG. 3, the pedal fault diagnosis apparatus 300 may include a processor 301, a memory 302, and an input/output port 303. The processor 301 is coupled to the memory 302 and the input/output port 303, for example, through a communications bus connection.

The following describes each component of the pedal fault diagnosis apparatus 300 with reference to FIG. 3.

The processor 301 is a control center of the pedal fault diagnosis apparatus 300, and may be a processor, or may be a general name of a plurality of processing elements. For example, the processor 301 is a central processing unit (CPU), or may be an application specific integrated circuit (ASIC), or is configured as one or more integrated circuits implementing the embodiments of this application, for example, one or more digital signal processors (DSP), or one or more field programmable gate arrays (FPGA).

The processor 301 may run or execute a software program stored in the memory 302, and invoke data stored in the memory 302, to perform various functions of the pedal fault diagnosis apparatus 300.

In specific implementations, in an embodiment, the processor 301 may include one or more CPUs, for example, a CPU 0 and a CPU 1 that are shown in FIG. 3.

In the specific implementations, in an embodiment, the pedal fault diagnosis apparatus 300 may alternatively include a plurality of processors, for example, a processor 301 and a processor 304 that are shown in FIG. 3. Each of the processors may be a single-core processor (single-CPU) or may be a multi-core processor (multi-CPU). The processor herein may be one or more vehicle-mounted control devices, circuits, and/or processing cores configured to process data (for example, computer program instructions).

The memory 302 may be a read-only memory (ROM) or another type of static storage pedal fault diagnosis device that can store static information and instructions, or a random access memory (RAM) or another type of dynamic storage pedal fault diagnosis device that can store information and instructions, also may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage pedal fault diagnosis device, or any other medium that can be used to carry or store expected program code in a form of instructions or a data structure and that is accessible by a computer, and is not limited thereto. The memory 302 may exist independently, or may be integrated with the processor 301.

The memory 302 is configured to store a software program for performing solutions of this application, and the processor 301 controls execution of the software program. For the foregoing specific implementations, refer to the following method embodiment. Details are not described herein.

The input/output port 303 is configured to: receive detection results from the various sensors, send torque instructions to a power subsystem 105, and/or send alarm information to an alarm apparatus 106.

It should be noted that, a structure of the pedal fault diagnosis apparatus 300 shown in FIG. 3 does not constitute a limitation on the pedal fault diagnosis apparatus, and an actual pedal fault diagnosis apparatus may include more or fewer components than those shown in the figure, for example, a communications module configured to communicate with another vehicle or a wireless network, and a positioning and navigation module configured to locate and navigate a vehicle, or a combination of some components, or a different component arrangement.

The pedal fault diagnosis method provided in the embodiments of this application is described below with reference to FIG. 2 and FIG. 4.

Figure 4:
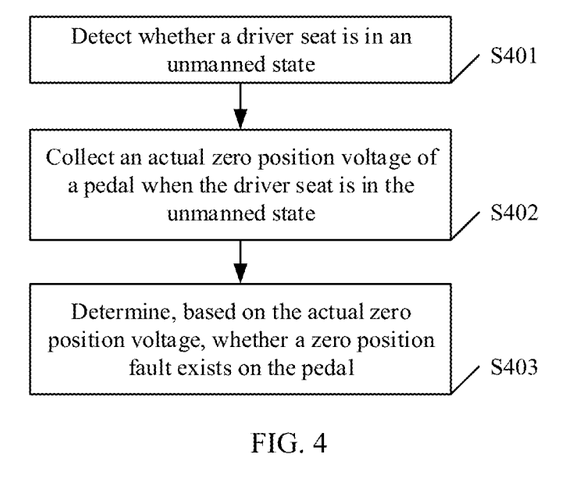
FIG. 4 is a flowchart diagram of a pedal fault diagnosis method according to some embodiments of this application.

FIG. 4 is a flowchart diagram of a pedal fault diagnosis method according to an embodiment of this application. The pedal fault diagnosis method may be applied to a vehicle-mounted control system shown in FIG. 1 to detect the two pedal faults shown in FIG. 2.

As shown in FIG. 4, the pedal fault diagnosis method includes the following steps.

S401: Detecting whether a driver seat is in an unmanned state.

For example, the detecting whether a driver seat is in an unmanned state may include one or more of the following: detecting whether there is face information in a position corresponding to the driver seat; and detecting whether a pressure sustained by the driver seat is less than a pressure threshold.

For example, referring to FIG. 1, the vehicle-mounted controller 101 may perform face recognition on image information collected by the driver position vision sensor 103. If face information is recognized, it may be considered that the driver seat is in a manned state; and if no face information is recognized, it is considered that the driver seat is in the unmanned state.

For example, referring to FIG. 1, the vehicle-mounted controller 101 may determine whether a pressure value collected by the driver seat pressure sensor 104, namely, the pressure sustained by the driver seat, is greater than the pressure threshold. If the pressure value is greater than the pressure threshold, it may be considered that the driver seat is in the manned state; and if the pressure value is less than or equal to the pressure threshold, it is considered that the driver seat is in the unmanned state. The pressure threshold may be set based on an actual situation, for example, may be set to 45 kilograms (kg) or 50 kg based on a weight of an adult.

The foregoing two conditions for determining that the driver seat is in the unmanned state may also be used in combination for further improving the confidence of a determined result. Therefore, in some embodiments, if no face information is detected in a position corresponding to the driver seat, and the pressure sustained by the driver seat is less than the pressure threshold, it may be determined that the driver seat is in the unmanned state.

In addition, determining may also be made with reference to a detection result of another vehicle-mounted sensor. In some embodiments, joint determining may be made based on an image collected by the driver position vision sensor 103 and a detection result of a steering wheel sensor (not shown in FIG. 1), for example, an angle sensor.

S402: Collecting an actual zero position voltage of a pedal when the driver seat is in the unmanned state.

Referring to FIG. 1, when it is determined that the driver seat is in the unmanned state, the vehicle-mounted controller 101 receives an actual zero position voltage of the pedal collected by the pedal position sensor 102. In some embodiments, when the driver seat is in the unmanned state, a plurality of groups of pedal voltages may be continuously collected. If an absolute value of a difference between a maximum value and a minimum value in the plurality of groups of pedal voltages is less than a dejitter voltage threshold, an average value of the plurality of groups of pedal voltages is used as the actual zero position voltage (referred to as first dejitter processing). The dejitter voltage threshold may be set based on an actual situation, and is usually a relatively small value, for example, 15 millivolts (mV).

S403: Determining, based on the actual zero position voltage, whether a zero position fault exists on the pedal.

In some embodiments, in S403, the determining, based on the actual zero position voltage, whether a zero position fault exists on the pedal may include the following steps:

calculating an absolute value of a difference between the actual zero position voltage and an initial zero position voltage; and determining, based on a comparison result between the absolute value and a voltage threshold, whether the zero position fault exists on the pedal.

In a possible design method, the voltage threshold may include a first voltage threshold, and the zero position fault may include a jamming fault of the pedal. Correspondingly, the determining, based on a comparison result between the absolute value and a voltage threshold, whether a zero position fault exists on the pedal may include the following step:

if the absolute value is greater than or equal to the first voltage threshold, it is determined that the jamming fault exists in the pedal. The first voltage threshold may be set based on an actual situation, and is usually a relatively large value. For example, the first voltage threshold may be a voltage value corresponding to a maximum offset position that the pedal can reach when the pedal is not pressed under normal use and aging. In an actual application, first voltage thresholds of pedals produced by different manufacturers may be obtained through durability and aging tests.

For example, referring to FIG. 1 and FIG. 2, the first voltage threshold may be a voltage value collected by the pedal position sensor 102 when a displacement of the pedal is 1%.

Further, the pedal fault diagnosis method shown in FIG. 4 may include the following step:

Outputting prompt information.

The prompt information may include one or more of the following forms: a sound, a text, and an image and is used to prompt a driver to check whether there is a foreign object in the space in which the pedal is located. The driver may check and remove, based on the prompt information, the foreign object in the space in which the pedal is located, to improve driving safety.

For example, the prompt information may be output by using an output device such as a vehicle-mounted speaker, a prompt light, or a display when it is again detected that the driver seat is in the manned state, or may be immediately output when the jamming fault is detected. Alternatively, the prompt information may be sent to a handheld terminal such as a mobile phone of the driver when there is a signal connection between a vehicle-mounted controller and the handheld terminal of the driver. A specific output manner of the prompt information and a device or an apparatus receiving the prompt information are not limited in the embodiments of this application.

Alternatively, in some embodiments, the pedal fault diagnosis method may further include the following step:

processing the pedal as having a pedal displacement of zero degrees. The processing the pedal as having the pedal displacement of zero degrees includes: when it is detected that a voltage that is collected when the pedal is pressed is less than or equal to an actual zero position voltage corresponding to the jamming fault, processing the pedal as it is at a displacement degree of zero, that is, processing as the pedal is not pressed, to ensure driving safety.

It is easy to understand that, when the driver seat is in the unmanned state, if a voltage V1 detected when the pedal is pressed is greater than the actual zero position voltage corresponding to the jamming fault, the voltage V1 is set as a processing reference. For example, an absolute value of a difference between the voltage V1 and a voltage collected when the driver seat is in the manned state, when the pedal is pressed, is used as a set value of a zero position voltage in a controller, which is used to generate torque instructions for controlling a vehicle action. For example, as shown in FIG. 2, the actual zero position voltage when the jamming fault exists on the pedal is a zero position voltage V1 collected by a pedal sensor when the pedal is at a position 203.

Alternatively, in some embodiments, the pedal fault diagnosis method may further include the following step:

controlling a vehicle to enter a speed limit mode. The speed limit mode controls a speed of the vehicle to be less than or equal to a first safe speed threshold to ensure driving safety. The first safe speed threshold may be determined based on an empirical value of safe driving, for example, may be set to 60 kilometers per hour (km/h) or 80 km/h.

It should be noted that only some of the options of the outputting prompt information, the processing the pedal as having the pedal displacement of zero degrees, and the controlling a vehicle to enter a speed limit mode may be performed. For example, only the outputting prompt information is performed, or all the options may be performed. This is not limited in this embodiment of this application.

In another possible design method, the voltage threshold includes a first voltage threshold and a second voltage threshold, the first voltage threshold is greater than the second voltage threshold, and the zero position fault may include a zero position offset fault of the pedal. The second voltage threshold may be a minimum correction unit of a zero position offset of the pedal, and may usually be determined by a vehicle manufacturer based on travel length of the pedal, which corresponds to a minimum adjustable torque of a vehicle pedal when a vehicle is designed and produced. The main function of such settings is to avoid frequent zero position corrections that affect a service life of a vehicle-mounted controller. For example, a quantity of writes into an EEPROM is limited. Frequent writes may affect a service life of the EEPROM, thereby affecting the service life of the vehicle-mounted controller.

Correspondingly, in S403, the determining, based on a comparison result between the absolute value and the voltage threshold, whether the zero position fault exists on the pedal may include the following step:

if the absolute value is less than the first voltage threshold and it is greater than or equal to the second voltage threshold, then determining that a zero position offset fault exists on the pedal.

It is easy to understand that, when it is detected that a voltage V2 that is collected when the pedal is pressed and the driver seat is in the unmanned state is greater than an actual zero position voltage corresponding to the zero position offset fault, the voltage V2 is set as a processing reference. For example, an absolute value of a difference between the voltage V2 and a voltage that is collected when the driver seat is in the manned state, that is, when the pedal is pressed, is used as a set value of a zero position voltage in a controller, to generate a torque instruction used to control a vehicle action.

For example, as shown in FIG. 2, the actual zero position voltage that is collected when the jamming fault exists on the pedal is a zero position voltage V2 collected by a pedal sensor when the pedal is at a position 202.

To further improve security of the collected actual zero position voltage and avoid false alarms, another round of dejitter processing (second dejitter processing) may be performed when it is determined that the pedal is in a suspected zero position offset fault. In some embodiments, the following steps may be included: setting a flag of the suspected zero position offset fault to 1; setting a dejitter accumulator; when the suspected zero position offset fault is detected again, increasing a count value of the dejitter accumulator by 1; and then, when the count value of the dejitter accumulator is greater than or equal to a dejitter threshold, that is, when a quantity of occurrences of the suspected zero position offset fault is greater than or equal to the dejitter threshold, determining that the zero position offset fault occurs. The actual zero position voltage used in a process of determining the suspected zero position offset fault may be an actual zero position voltage obtained after the first dejitter processing in S401 is performed. It is easy to understand that, within a preset detection period, if the count value of the dejitter accumulator does not reach the dejitter threshold, S401 is performed again, or the current round of detection ends. The preset detection period may be greater than or equal to a minimum detection duration of a vehicle-mounted control system. For example, the minimum detection duration is 1 second(s), and the preset detection period may be 1s, or may be slightly greater than the preset detection period, for example, 1.2 s.

In addition, the second dejitter processing may further include the following step: when it is detected that a decision condition of the suspected zero position offset fault is not met, that is, when an absolute value of a difference between a largest value and a smallest value in a plurality of groups of pedal voltages detected in a process of the first dejitter processing is greater than or equal to the dejitter voltage threshold, ending the current round of fault detection, or performing S401 again, and resetting the count value of the dejitter accumulator to 0.

Alternatively, in some embodiments, the pedal fault diagnosis method may further include the following step:

determining an actual zero position voltage as a set value of a zero position voltage in a controller. The set value of the zero position voltage in the controller is used to calculate a displacement of the pedal, and generate torque instructions for controlling a vehicle action, to improve vehicle control safety:

Further, there may be a plurality of actual zero position voltages. Correspondingly, the determining an actual zero position voltage as a set value of a zero position voltage in a controller may include the following step:

determining a largest value in the plurality of actual zero position voltages as the set value of the zero position voltage of the controller, to further improve vehicle control safety.

According to the pedal fault diagnosis method provided in the embodiments of this application, it can be detected whether there is a person in a driver seat: the actual zero position voltage of the pedal that is present when the driver seat is in the unmanned state is collected, in other words, the actual zero position voltage that is present when the pedal is not pressed is collected: it is determined, based on the actual zero position voltage, whether a zero position fault, such as the zero position offset fault or the jamming fault, exists on the pedal; and then, a vehicle can be controlled based on the actual zero position voltage, for example, a set value of a zero position voltage in a vehicle-mounted controller is updated to the collected actual zero position voltage. The method can resolve a problem that in a process of indirectly inferring, based on a driving operation or statistical data, whether the zero position fault exists on the pedal, due to an inability to accurately infer whether the pedal is pressed, the actual zero position voltage that is collected when the pedal is pressed is updated to the set value of the zero position voltage in the vehicle-mounted controller, and a control instruction such as a torque instruction issued by the vehicle-mounted controller cannot reflect an actual operation condition of the vehicle, and vehicle control safety is poor. This can improve vehicle control safety, and reduce driving risk.

In addition, according to the pedal fault diagnosis method provided in this embodiment of this application, whether the zero position fault exists on the pedal may be detected based on an existing vehicle-mounted sensor, and there is no need to add an additional sensor, for example, a camera that is added in the space in which the pedal is located to detect whether the pedal is jammed by a foreign object. This does not increase vehicle costs.

The pedal fault diagnosis method provided in the embodiments of this application is described in detail above with reference to FIG. 2 and FIG. 4. The pedal fault diagnosis apparatus provided in the embodiments of this application is described below with reference to FIG. 5 and FIG. 6.

Figure 5:
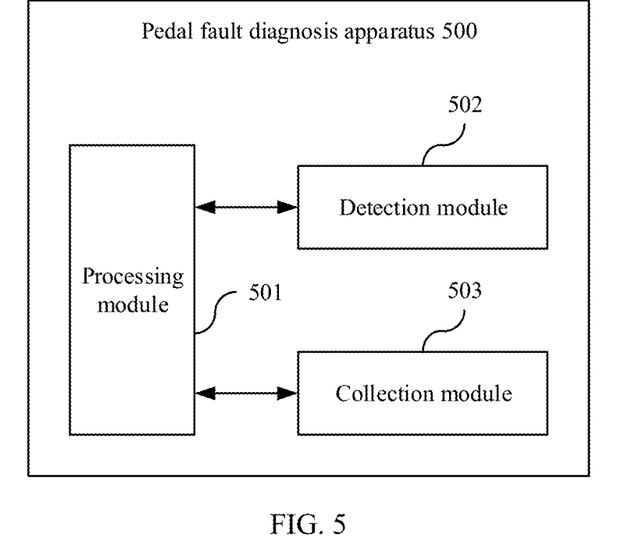
FIG. 5 is a schematic structural diagram 2 of a pedal fault diagnosis apparatus according to some embodiments of this application.

FIG. 5 is a schematic structural diagram 2 of a pedal fault diagnosis apparatus according to an embodiment of this application. The pedal fault diagnosis apparatus may be applied to the vehicle-mounted control system shown in FIG. 1 to implement the pedal fault diagnosis method shown in FIG. 4. For ease of description, FIG. 5 shows only main components of the pedal fault diagnosis apparatus.

As shown in FIG. 5, the pedal fault diagnosis apparatus 500 may include a processing module 501, a detection module 502, and a collection module 503.

The detection module 502 is configured to detect whether a driver seat is in an unmanned state.

The collection module 503 is configured to collect an actual zero position voltage of a pedal when the driver seat is in the unmanned state.

The processing module 501 is configured to determine, based on the actual zero position voltage, whether a zero position fault exists on the pedal.

In some embodiments, the detection module 502 is further configured to detect whether there is face information in a position corresponding to the driver seat, and/or detect whether a pressure sustained by the driver seat is less than a pressure threshold.

For example, if the detection module 502 does not detect the face information in the position corresponding to the driver seat, and/or detects that the pressure sustained by the driver seat is less than the pressure threshold, the processing module 501 may determine that the driver seat is in the unmanned state.

In some embodiments, the processing module 501 is further configured to calculate an absolute value of a difference between the actual zero position voltage and an initial zero position voltage, and determine, based on a comparison result between the absolute value and a voltage threshold, whether the zero position fault exists on the pedal.

In a possible design, the voltage threshold may include a first voltage threshold, and the zero position fault may include a jamming fault of the pedal. Correspondingly, the processing module 501 is further configured to: if the absolute value is greater than or equal to the first voltage threshold, determine that the jamming fault exists on the pedal.

Figure 6:
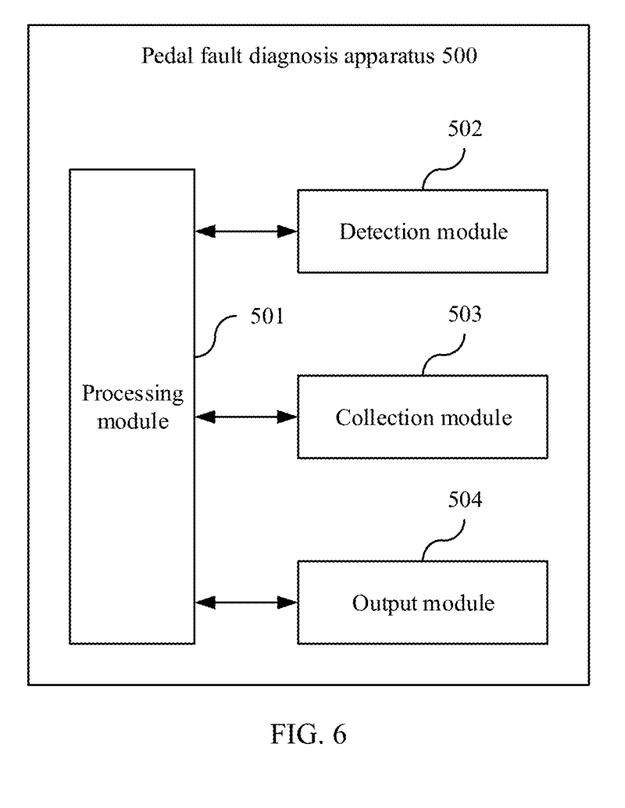
FIG. 6 is a schematic structural diagram 3 of a pedal fault diagnosis apparatus according to some embodiments of this application.

FIG. 6 is a schematic structural diagram of a pedal fault diagnosis apparatus according to an embodiment of this application. In some embodiments, with reference to FIG. 5, as shown in FIG. 6, the pedal fault diagnosis apparatus 500) may further include an output module 504. The output module 504 is configured to output prompt information. The prompt information may include a sound, a text, an image, and the like, and is used to prompt a driver to check whether there is a foreign object in the space in which the pedal is located.

Alternatively, in some embodiments, the processing module 501 is further configured to process a pedal as having a pedal displacement of 0. The processing as having the pedal displacement of 0 is: when it is detected that a voltage that is collected when the pedal is pressed is less than or equal to the actual zero position voltage corresponding to the jamming fault, processing the pedal as having the pedal displacement of 0.

Alternatively, in some embodiments, the processing module 501 is further configured to control a vehicle to enter a speed limit mode. The speed limit mode controls a speed of the vehicle to be less than or equal to a first safe speed threshold.

In another possible design, the voltage threshold may include a first voltage threshold and a second voltage threshold, the first voltage threshold is greater than the second voltage threshold, and the zero position fault may include a zero position offset fault of the pedal. Correspondingly, the processing module 501 is further configured to: if the absolute value is less than the first voltage threshold and is greater than or equal to the second voltage threshold, determine that the zero position offset fault exists on the pedal.

Alternatively, in some embodiments, the processing module 501 is further configured to determine the actual zero position voltage as a set value of a zero position voltage in a controller. The set value of the zero position voltage in the controller is used to calculate a displacement of the pedal.

Further, there may be a plurality of actual zero position voltages. Alternatively, in some embodiments, the processing module 501 is further configured to determine a largest value in the plurality of actual zero position voltages as the set value of the zero position voltage in the controller.

In some embodiments, the pedal fault diagnosis apparatus 500 may further include a storage module (not shown in FIG. 5 or FIG. 6). The storage module stores a program or instructions. When the processing module 501 executes the program or the instructions, the pedal fault diagnosis apparatus 500 shown in FIG. 5 or FIG. 6 may perform the pedal fault diagnosis method described in the foregoing method embodiment.

It should be noted that the pedal fault diagnosis apparatus 500 may be a vehicle-mounted controller, or may be a chip or chip system disposed in the vehicle-mounted controller, or may be a vehicle in which the vehicle-mounted control system is disposed. This is not limited in this application.

For technical effects of the pedal fault diagnosis apparatus 500 shown in FIG. 5 or FIG. 6, refer to the technical effects of the pedal fault diagnosis method described in the foregoing method embodiment. Details are not described herein.

The embodiments of this application provide a chip system. The chip system includes a processor and an input/output port. The processor is configured to implement a processing function in the pedal fault diagnosis method described in the foregoing method embodiment. The input/output port is configured to implement a sending and receiving function in the pedal fault diagnosis method described in the foregoing method embodiment.

In a possible design, the chip system further includes a memory. The memory is configured to store program instructions and data in implementing the foregoing method embodiment.

The chip system may include a chip, or may include a chip and another discrete component.

For technical effects of the chip system, refer to the technical effects of the pedal fault diagnosis method described in the foregoing method embodiment. Details are not described herein.

The embodiments of this application provide a vehicle-mounted controller. The vehicle-mounted controller may include the pedal fault diagnosis apparatus, or the chip system.

The embodiments of this application provide a vehicle-mounted control system. The vehicle-mounted control system may include the vehicle-mounted controller.

The embodiments of this application provide a vehicle. The vehicle may include the vehicle-mounted control system.

The embodiments of this application provide a computer-readable storage medium. The computer-readable storage medium includes a program or instructions, and when the program or the instructions are run on a computer, the computer is enabled to perform the pedal fault diagnosis method described in the foregoing method embodiment.

The embodiments of this application provide a computer program product. The computer program product includes a computer program code, when the computer program code is run on a computer, the computer is enabled to perform the pedal fault diagnosis method described in the foregoing method embodiment.

It should be understood that, the processor in the embodiments of this application may be a central processing unit (CPU), or may be another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware (for example, a circuit), firmware, or any combination thereof. When software is used to implement the embodiments, all or some of the foregoing embodiments may be implemented in a form of a computer program product. The computer program product includes one or more computer instructions or computer programs. When the computer instructions or the computer programs are loaded or executed on a computer, all or some of the procedures or functions according to the embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In this application, "at least one" means one or more, and "a plurality of" means two or more. "At least one item (piece) of the following" or a similar expression thereof refers to any combination of these items, including any combination of singular items (pieces) or plural items (pieces). For example, at least one of a, b, or c may indicate:

a, b, c, a and b, a and c, b and c, or a, b, and c, where a, b, and c may be singular or plural.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual coupling or direct coupling or pedal fault diagnosis connection may be implemented by using some interfaces. Indirect coupling or pedal fault diagnosis connection between devices or units may be electrical, mechanical or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement that can be readily figured out by the person skilled in the art within the technical scope disclosed in this application shall fall within the protection scope of this application. Therefore, the protection scope of this application shall be subject to the protection scope of the claims.

What is claimed is:

1. A pedal fault diagnosis method, comprising:
   detecting a driver seat is in an unmanned state;
   measuring an actual zero position voltage of a pedal while the driver seat is in the unmanned state;
   determining, based on the actual zero position voltage, that a zero position fault exists on the pedal; and
   controlling a vehicle to enter a speed limiting mode, wherein the speed limiting mode controls a speed of the vehicle to be less than or equal to a first safe speed threshold.

2. The pedal fault diagnosis method according to claim 1, wherein detecting that the driver seat is in the unmanned state comprises one or more of:
   detecting that there is no face information in a position corresponding to the driver seat; and
   detecting that a pressure sustained by the driver seat is less than a pressure threshold.

3. The pedal fault diagnosis method according to claim 1, wherein determining, based on the actual zero position voltage, that the zero position fault exists on the pedal comprises:
   calculating an absolute value of a difference between the actual zero position voltage and an initial zero position voltage; and
   determining, based on a comparison result of the absolute value and a primary voltage threshold, that the zero position fault exists on the pedal.

4. The pedal fault diagnosis method according to claim 3, wherein the primary voltage threshold comprises a first voltage threshold, and the zero position fault comprises a jamming fault of the pedal; and
   determining, based on the comparison result of the absolute value and the primary voltage threshold, that the zero position fault exists on the pedal comprises:
   determining that the absolute value is greater than or equal to the first voltage threshold.

5. The pedal fault diagnosis method according to claim 4, wherein the method further comprises:
   outputting prompt information, wherein the prompt information is used to prompt a driver to check for a foreign object in a space in which the pedal is located.

6. The pedal fault diagnosis method according to claim 4, wherein the method further comprises:
   processing the pedal as the pedal is at a displacement of zero, wherein the displacement of zero processing comprises: detecting that a voltage that is measured when the pedal is pressed is less than or equal to an actual zero position voltage corresponding to the jamming fault, processing the pedal according to the displacement of zero.

7. The pedal fault diagnosis method according to claim 3, wherein the primary voltage threshold comprises a first voltage threshold and a second voltage threshold, the first voltage threshold is greater than the second voltage threshold, and the zero position fault comprises a zero position offset fault of the pedal; and determining, based on the comparison result of the absolute value and the primary voltage threshold, whether the zero position fault exists on the pedal comprises:

determining that the absolute value is less than the first voltage threshold and is greater than or equal to the second voltage threshold.

8. The pedal fault diagnosis method according to claim 7, wherein the method further comprises:

determining the actual zero position voltage as a stored zero position voltage value in a controller, wherein the zero position voltage value is used to calculate a displacement of the pedal.

9. The pedal fault diagnosis method according to claim 8, wherein there are a plurality of actual zero position voltages; and determining the actual zero position voltage as the stored zero position voltage in the controller comprises:

determining a largest value in the plurality of actual zero position voltages as the stored zero position voltage in the controller.

10. A pedal fault diagnosis apparatus, comprising:
a processor, coupled to a memory;
the memory, storing a computer program; and
wherein the processor is configured to execute the computer program stored in the memory, so that the pedal fault diagnosis apparatus is caused to perform:
detecting a driver seat is in an unmanned state;
measuring an actual zero position voltage of a pedal while the driver seat is in the unmanned state;
determining, based on the actual zero position voltage, that a zero position fault exists on the pedal; and
controlling a vehicle to enter a speed limiting mode, wherein the speed limiting mode controls a speed of the vehicle to be less than or equal to a first safe speed threshold.

11. The pedal fault diagnosis apparatus according to claim 10, wherein the processor is further configured to execute the computer program which causes the pedal fault diagnosis apparatus to:

detect that there is no face information in a position corresponding to the driver seat; and/or detect that a pressure sustained by the driver seat is less than a pressure threshold.

12. The pedal fault diagnosis apparatus according to claim 10, wherein the processor is further configured to execute the computer program which causes the pedal fault diagnosis apparatus to:

calculate an absolute value of a difference between the actual zero position voltage and an initial zero position voltage; and determine, based on a comparison result of the absolute value and a primary voltage threshold, whether the zero position fault exists on the pedal.

13. The pedal fault diagnosis apparatus according to claim 12, wherein the primary voltage threshold comprises a first voltage threshold and a second voltage threshold, the first voltage threshold is greater than the second voltage threshold, and the zero position fault comprises a zero position offset fault of the pedal; and wherein the processor is further configured to execute the computer program which causes the pedal fault diagnosis apparatus to:

determine that the absolute value is less than the first voltage threshold and is greater than or equal to the second voltage threshold.

14. The pedal fault diagnosis apparatus according to claim 13, wherein the processor is further configured to execute the computer program which causes the pedal fault diagnosis apparatus to:

determine the actual zero position voltage as a stored zero position voltage value in a controller, wherein the zero position voltage value is used to calculate a displacement of the pedal.

15. The pedal fault diagnosis apparatus according to claim 14, wherein there are a plurality of actual zero position voltages; and wherein in determining the actual zero position voltage as the stored zero position voltage in the controller, the processor is further configured to execute the computer program which causes the pedal fault diagnosis apparatus to:

determine a largest value in the plurality of actual zero position voltages as the stored zero position voltage in the controller.

16. The pedal fault diagnosis apparatus according to claim 13, wherein the primary voltage threshold comprises a first voltage threshold, and the zero position fault comprises a jamming fault of the pedal; and wherein the processor is further configured to execute the computer program which causes the pedal fault diagnosis apparatus to:

determine that the absolute value is greater than or equal to the first voltage threshold.

17. The pedal fault diagnosis apparatus according to claim 16, wherein the processor is further configured to execute the computer program which causes the pedal fault diagnosis apparatus to:

output prompt information, wherein the prompt information is used to prompt a driver to check for a foreign object in a space in which the pedal is located.

18. The pedal fault diagnosis apparatus according to claim 16, wherein the processor is further configured to execute the computer program which causes the pedal fault diagnosis apparatus to:

process the pedal as a displacement of zero, wherein the displacement of zero processing comprises: detecting that a voltage that is measured when the pedal is pressed is less than or equal to an actual zero position voltage corresponding to the jamming fault, processing the pedal according to the displacement of zero.

* * * * *